(12) United States Patent
Grassia

(10) Patent No.: US 8,914,943 B2
(45) Date of Patent: Dec. 23, 2014

(54) WHEEL ASSEMBLY

(75) Inventor: Robert Grassia, Summer Hill (AU)

(73) Assignee: Breville Pty Limited, New South Wales (AU)

( * ) Notice: Subject to any disclaimer, the term of this patent is extended or adjusted under 35 U.S.C. 154(b) by 0 days.

(21) Appl. No.: 14/005,825

(22) PCT Filed: Mar. 23, 2012

(86) PCT No.: PCT/AU2012/000288
§ 371 (c)(1),
(2), (4) Date: Nov. 7, 2013

(87) PCT Pub. No.: WO2012/126051
PCT Pub. Date: Sep. 27, 2012

(65) Prior Publication Data
US 2014/0075717 A1 Mar. 20, 2014

(30) Foreign Application Priority Data
Mar. 23, 2011 (AU) ................. 2011901066

(51) Int. Cl.
| | | |
|---|---|---|
| E05F 1/08 | (2006.01) | |
| B60B 33/06 | (2006.01) | |
| B60B 5/02 | (2006.01) | |
| B60B 33/00 | (2006.01) | |

(52) U.S. Cl.
CPC ............. *B60B 33/063* (2013.01); *B60B 5/02* (2013.01); *B60B 33/0023* (2013.01); *B60B 33/0049* (2013.01); *B60B 33/06* (2013.01); *B60B 2200/49* (2013.01)

USPC ...................................... 16/19; 16/32; 99/279

(58) Field of Classification Search
CPC B60B 33/00; B60B 33/0002; B60B 33/0005; B60B 33/04; B60B 33/045; B60B 33/06; B60B 33/063; A47J 31/3614
USPC .............. 16/18 R, 19, 45–47, 32–34; 280/43, 280/43.17; 99/289 R, 279; D7/309
See application file for complete search history.

(56) References Cited

U.S. PATENT DOCUMENTS

| | | | | |
|---|---|---|---|---|
| 1,076,778 | A * | 10/1913 | Medart | 16/32 |
| 1,353,784 | A * | 9/1920 | Peterson | 16/33 |
| 1,822,433 | A * | 9/1931 | Brand | 99/289 R |
| 2,358,007 | A * | 9/1944 | Henley | 16/32 |
| 2,631,329 | A * | 3/1953 | McKean | 16/21 |
| 2,737,682 | A * | 3/1956 | Holtz | 16/32 |
| 2,776,446 | A * | 1/1957 | Brace | 15/359 |
| 2,803,510 | A * | 8/1957 | Carbary | 312/351.13 |
| 2,874,971 | A * | 2/1959 | Devery | 280/46 |
| 2,879,075 | A * | 3/1959 | Wallace | 280/43.2 |
| 3,534,430 | A * | 10/1970 | Livesay et al. | 16/34 |
| 3,635,491 | A * | 1/1972 | Drews et al. | 280/43.14 |
| 4,007,512 | A * | 2/1977 | Oland | 16/19 |
| 4,194,266 | A * | 3/1980 | Natzel | 16/99 |

(Continued)

*Primary Examiner* — William Miller
(74) *Attorney, Agent, or Firm* — Molins & Co Pty Ltd

(57) ABSTRACT

A caster wheel device for a domestic appliance is in the form of a wheel mounting carriage, a dial having an underside forming a cam, a cam follower that contacts the cam, a wheel bracket and a wheel. The wheel bracket retains the wheel within it so that the wheel and bracket pivot about the follower independently of the carriage. The cam follower is attached to the wheel bracket and the wheel is able to trail behind the cam follower to form a trailing wheel caster when lowered.

19 Claims, 6 Drawing Sheets

(56) References Cited

U.S. PATENT DOCUMENTS

| | | | |
|---|---|---|---|
| 4,249,282 A * | 2/1981 | Little | 16/32 |
| 4,974,500 A * | 12/1990 | Boyd et al. | 99/279 |
| 5,533,231 A * | 7/1996 | Bai | 16/34 |
| D451,749 S * | 12/2001 | Trazzi | D7/309 |
| 6,405,989 B2 * | 6/2002 | Davis et al. | 248/519 |
| 6,412,747 B2 * | 7/2002 | Davis et al. | 248/519 |
| 6,871,379 B2 * | 3/2005 | Ebeling et al. | 16/19 |
| 8,087,126 B2 * | 1/2012 | Duvert et al. | 16/33 |
| 8,136,201 B2 * | 3/2012 | Yantis et al. | 16/32 |
| 8,201,672 B2 * | 6/2012 | Yang | 190/18 A |
| 2005/0120518 A1 * | 6/2005 | Thompson et al. | 16/320 |
| 2009/0066150 A1 * | 3/2009 | O'Rourke, Sr. | 301/5.23 |
| 2011/0099753 A1 * | 5/2011 | Preschke et al. | 16/30 |

\* cited by examiner

WHEEL ASSEMBLY

FIELD OF THE INVENTION

The invention relates to wheel assemblies for domestic appliances and more particularly to a retractable wheel assembly.

BACKGROUND OF THE INVENTION

The present invention will be described in the context of a wheel assembly for home appliances such as kitchen appliances. However, it will be understood that the wheel assembly has uses on a wide range of devices. The present invention will also be described with respect to a coffee maker having both fixed wheels, and also with a single wheel assembly in accordance with the invention. It will be understood that the wheel assembly of the present invention may be used singularly or in number of two or greater. It will also be understood that the invention may be used in conjunction with fixed wheels, with other wheels or with no other wheels.

It is not always desirable to have an appliance permanently on free moving wheels. It is sometimes critical or at least convenient that an appliance be stable and fixed in position during operation. An appliance without wheels or in a fixed position that is larger heavy can be difficult to move and may restrict the user from carrying out necessary servicing, cleaning, or convenient manoeuvring of the appliances as required.

The present invention addresses at least some of the disadvantages of prior art wheel solutions.

OBJECTS AND SUMMARY OF THE INVENTION

It is an object of the invention to provide a retractable wheel assembly. Accordingly, there is provided a wheel that is mounted in a rotating bracket. The bracket is raised and lowered by a cam. The wheel may be a caster wheel.

Accordingly there is provided, a caster wheel device in the form of a wheel mounting carriage, a dial having an underside forming a cam, a cam follower that contacts the cam, a wheel bracket and a wheel. The wheel bracket retains the wheel within it so that the wheel and bracket pivot about the pin independently of the carriage. The cam follower is attached to the wheel bracket and the wheel trails behind the cam follower to form a trailing wheel caster when lowered.

In some embodiments, a wheel bracket cover is retained by the wheel bracket and has an opening through which the wheel extends.

Preferably, the wheel and the wheel bracket reciprocate vertically under the influence of the cam and the cam follower.

In some embodiments, rotation of the dial causes the cam follower and wheel to move vertically.

BRIEF DESCRIPTION OF THE DRAWING FIGURES

In order that the invention be better understood, reference is now made to the following drawing figures in which.

BEST MODE AND OTHER EMBODIMENTS OF THE INVENTION

Figure 1:
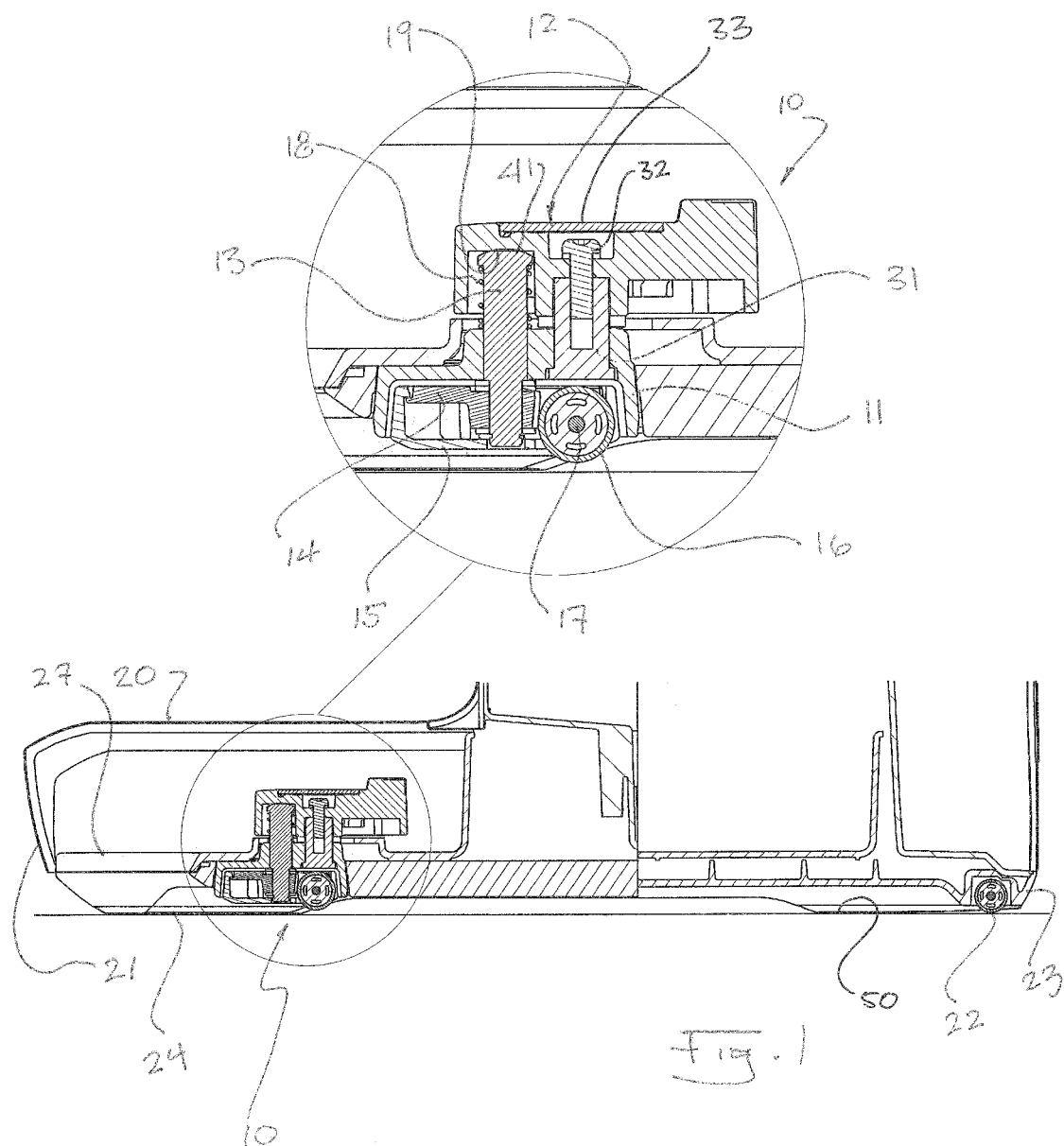
FIG. 1 is a side elevation, cross sectioned, and a detail illustrating a wheel assembly in accordance with the teachings of the present invention.

As shown in FIG. 1, a caster wheel assembly 10 comprises a wheel mounting carriage 11, a generally horizontal dial having an underside forming an optionally integrated rotating cam assembly 12, a cam follower pin 13 that acts as a caster pivot axle, a wheel bracket 14, a wheel bracket cover 15 and a wheel 16. The wheel bracket 14, optional wheel bracket cover 15 and wheel 16 pivot about the pin 13 independently of the carriage 11. The wheel 16 is mounted on an axle 17 that is retained by the wheel bracket 15. The wheel 16 is located behind and trails behind the pivot and cam follower pin 13 to form a trailing wheel caster when lowered. The wheel bracket cover 15 has an opening through which the wheel 16 extends and fits within a recess on the underside of the mounting carriage 11. The wheel, the wheel bracket and its cover reciprocate vertically under the influence of the rotary cam and the cam follower pin 13. Rotation of the knob 12 causes the cam follower pin 13 to move vertically. A compression spring 18 urges the cam follower pin 13 upward and into contact with or engagement with the cam surface 19. The cam follower pin may have a domed upper cam contacting surface to minimize friction both when pivoting and when following the cam surface.

The assembly 10, in this example, is concealed within the base of a domestic espresso coffee making machine. The assembly is located toward the front edge 21 of the base. One or more wheels such as fixed wheel sets 22 are provided toward the rear edge 23 of the base. Operation of the dial 12 allows the wheel bracket 14 and thus the wheel 16 to be raised and lowered relative to the espresso coffee machine. In FIG. 1, the wheel 16 is shown in the raised position. In this orientation, the coffee machine rests on the rear fixed feet 50 and the front, fixed feet 24 of the machine. The rear fixed feet are located between the rear wheel or wheels 22 and the caster wheel assembly 10. In this orientation, the rear wheel or wheels 22 are off of the rest surface and the machine is stable and entirely supported on fixed feet.

Figure 2:
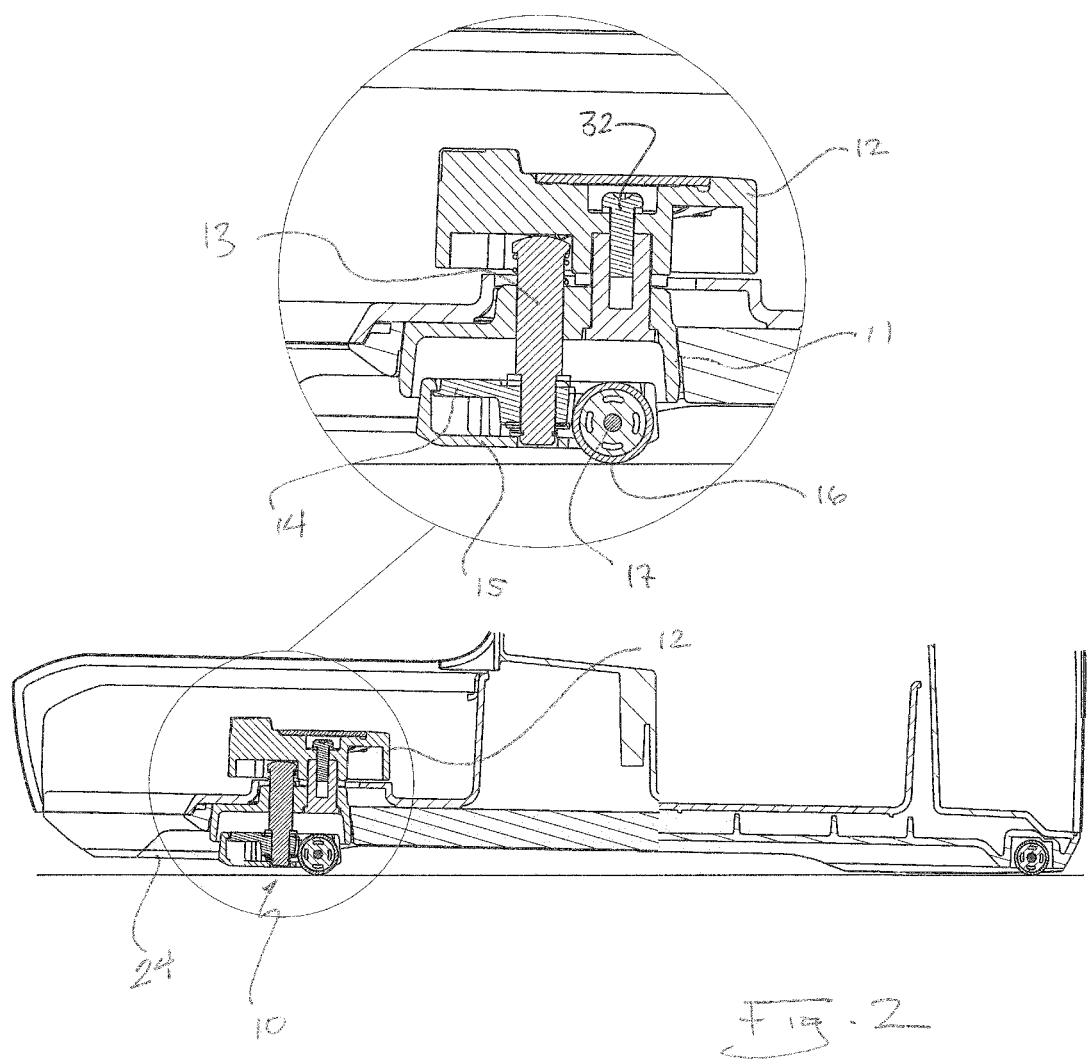
FIG. 2 is a side elevation, cross-sectioned to show the wheel assembly when it is lowered into contact with a counter or rest surface.

In FIG. 2, the wheel bracket 14 and wheel 16 are shown in a lowered orientation. In this orientation, the caster wheel assembly allows the caster wheel 16 to contact the rest surface and pivot about the cam pin 13. The machine can be easily steered and manoeuvred because it rests on the rear wheel or wheel 22 and the forward caster wheel 16 of the assembly 10. In this example, no fixed feet are in contact with the rest surface. Note that both the front fixed feet 24 and rear fixed feet 50 are raised off of the counter top surface by the lowering of the wheel bracket 14 and wheel 16.

Figure 3:
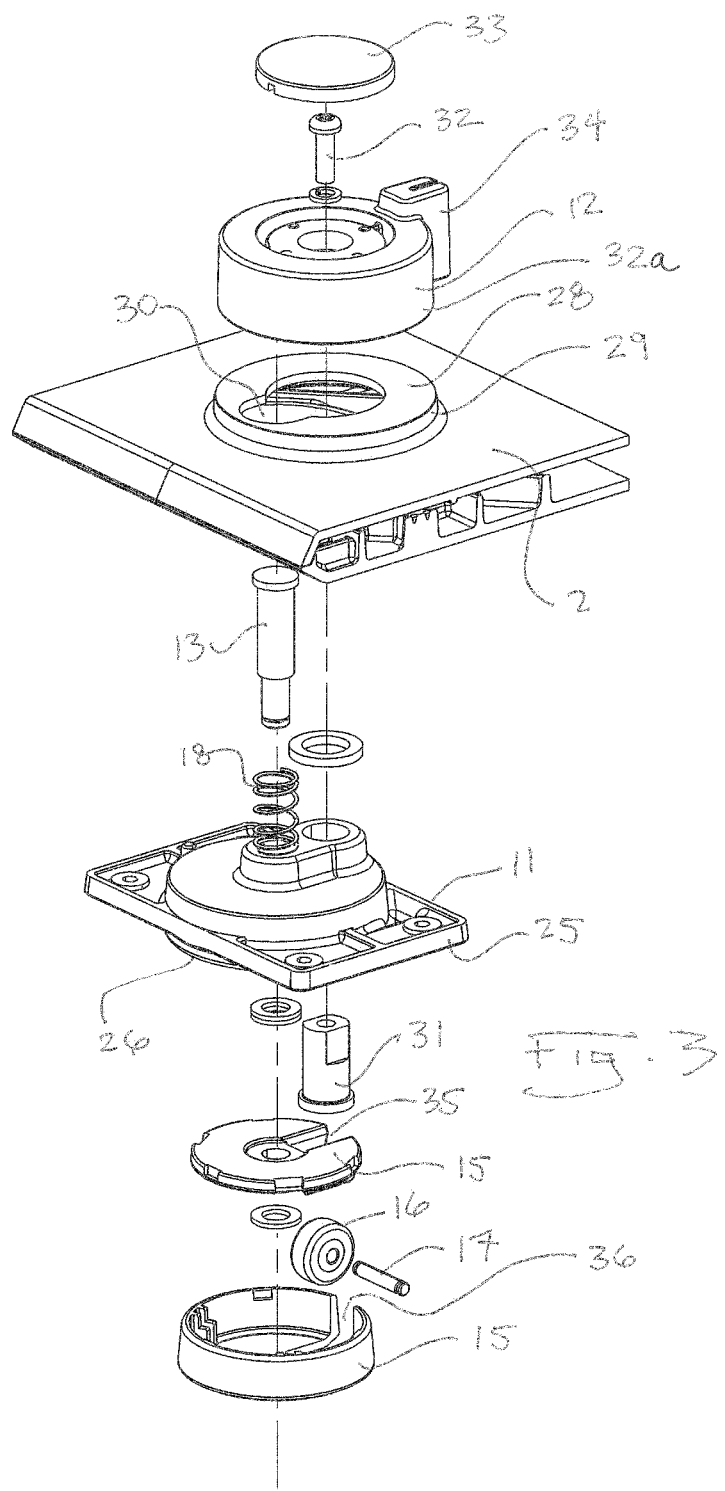
FIG. 3 is an exploded perspective view of a wheel assembly.

As shown in FIG. 3, the wheel assembly's carriage 11 comprises, for example, a chassis such as a rectangular chassis 25 having an internal recess 26 for receiving the wheel bracket 15. The carriage 11 is mounted to the underside of a user accessible surface 27, for example the lowest surface of a coffee machine that is revealed by removing a removable coffee preparation shelf of the machine. In this example, the surface 27 as a raised boss 28 whose peripheral edge or circumference 29 acts as a pilot for the rotating dial 12. The boss 28 has an opening through which pass the cam follower pin 13 and its compression spring 18. The opening 30 is also adapted to receive the dial's axle 31. The axel is flange mounted from within the recess of the carriage so that the dial 12 maybe attached to it. In this example a threaded fastener 32 passes through a central hub of the dial 12 and fixes the dial to the dial axis 31. The rim 32a of the dial may conceal the boss 28. A cap 33 may conceal the fastener 32. The dial has an optional radial extension 34 for making rotation easier. The wheel bracket 15 has a gap 35 for receiving the wheel axle 17 and the wheel 16. The wheel bracket cover 15 fits within the recess of the carriage ii and has a slot 36 that allows the wheel to protrude and make contact with the running surface.

Figure 4:
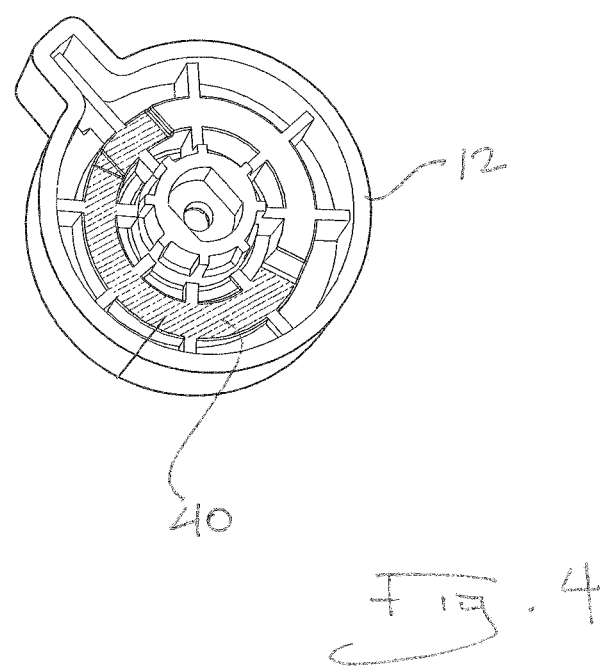
FIG. 4 is an underside perspective view of a knob and cam surface.

As shown in the example of FIG. 4, an integral arcuate cam surface 40 is formed onto and at least partially around the underside of the dial 12. The cam surface forms an arc of a circle and comprises a tapered ramp that is adapted to act on the head 41 of the cam follower pin 13. The head 41 maybe domed or provided with a polymeric cap to reduce friction. In this way, the cam urges the cam follower downward when rotated in one direction and allows the cam follower to rise under the influence of the spring 18 when rotated in the other direction.

Figure 5:
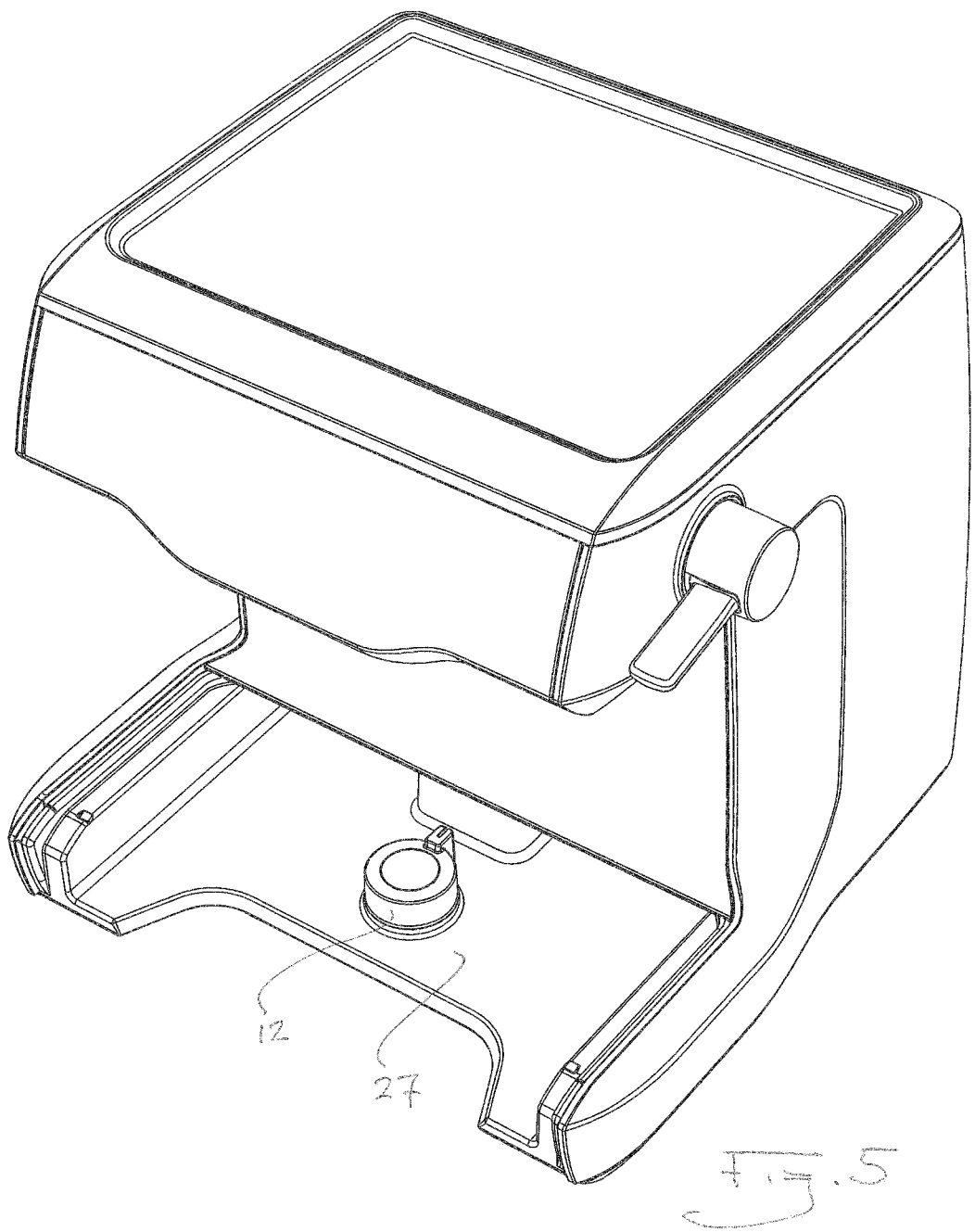
FIG. 5 is a perspective view of an espresso coffee machine having a wheel assembly.
Figure 6:
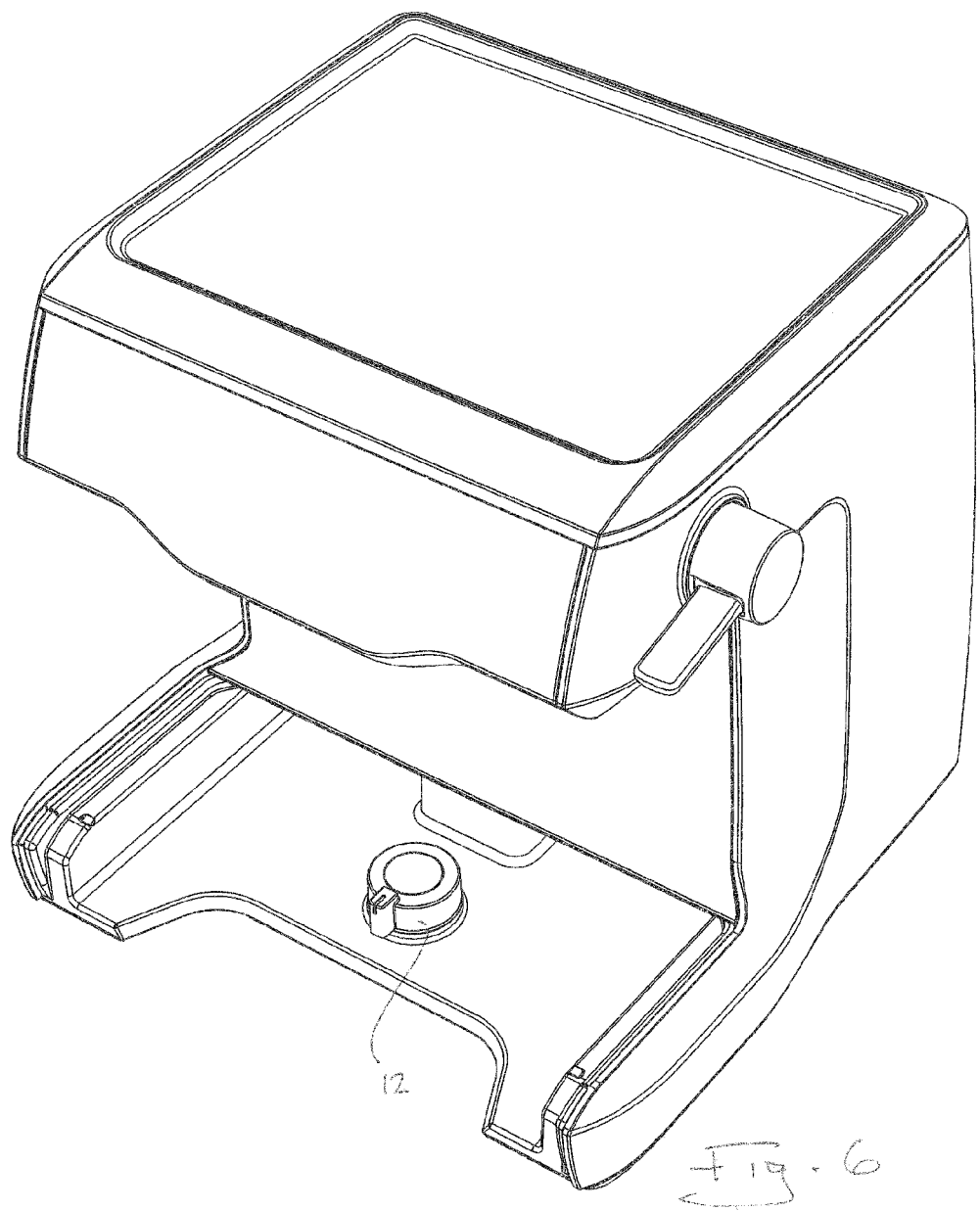
FIG. 6 is a perspective view of a coffee machine having a wheel assembly.

As shown in FIG. 5, one implementation of the invention uses a base surface 27 of a domestic coffee machine as the mounting surface. The dial 12 extends above the surface and is easily accessible by the user. As shown in FIG. 6, a 180 degree rotation of the dial 12 raises the front feet 24 by lowering the wheel 16 into contact with the surface that supports the coffee machine. The machine will then be capable of a range of motion based on the front caster wheel assembly 10 and the rear wheel or wheels.

While the present invention has been disclosed with reference to particular details of convenience and construction, these should be understood as having been provided by way of example and not as limitations to the scope of the claims or spirit of the invention.

What is claimed is:

1. A domestic appliance device having an underside supportable on a rest surface comprising:
   a retractable caster wheel assembly having a retracted and a lowered orientation;
   a rear fixed foot being located closer to a rear of the device than the caster wheel assembly;
   one or more rear wheels located closer to the rear of the device than the rear fixed foot;
   the rear wheels being in contact with the rest surface when the caster wheel assembly is in the lowered orientation and raised above the rest surface when the caster wheel assembly is in the retracted orientation.

2. The device of claim 1, wherein:
the rear wheels are fixed wheels.

3. The device of claim 2, wherein:
the appliance is a domestic coffee machine.

4. The device of claim 2 wherein:
the device has a front foot that is elevated above the rest surface when the caster wheel assembly is in the lowered orientation.

5. The device of claim 1, wherein:
the caster wheel assembly further comprises a vertically moveable pivot that carries a wheel bracket and wheel.

6. The device of claim 5, wherein:
the pivot is raised and lowered by the action of a rotating dial.

7. The device of claim 6, wherein:
the dial has an underside onto which is formed a cam surface.

8. The device of claim 7, wherein:
the cam surface is an arc of a circle.

9. The device of claim 5 wherein:
the caster wheel assembly further comprises a carriage having a recess and wheel bracket cover;
the wheel bracket cover fitting within the recess of the carriage.

10. The device of claim 9, wherein:
the wheel bracket cover has a slot through which protrudes the wheel.

11. The device of claim 1, wherein:
the appliance is a domestic coffee machine.

12. The device of claim 11 wherein:
the retractable caster wheel assembly is lowered by the action of a vertical axis rotating dial.

13. The device of claim 11 wherein:
the device has a front foot that is elevated above the rest surface when the caster wheel assembly is in the lowered orientation.

14. The device of claim 1 wherein:
the device has a front foot that is elevated above the rest surface when the caster wheel assembly is in the lowered orientation.

15. The device of claim 1 wherein:
the retractable caster wheel assembly is lowered into the lowered orientation from the retracted orientation by a 180 degree rotation of a rotating dial.

16. The device of claim 1 wherein:
the retractable caster wheel assembly is lowered by the action of a vertical axis rotating dial.

17. The device of claim 1 wherein:
the caster wheel assembly further comprises a carriage having a recess, wheel bracket and wheel bracket cover;
the wheel bracket cover fitting within the recess of the carriage.

18. The device of claim 17, wherein:
the wheel bracket cover has a slot through which protrudes the wheel.

19. The device of claim 18 wherein:
the retractable caster wheel assembly is lowered by the action of a vertical axis rotating dial.

* * * * *